United States Patent
Moon et al.

(10) Patent No.: US 11,229,858 B2
(45) Date of Patent: Jan. 25, 2022

(54) FILTER APPARATUS FOR OIL-WATER SEPARATION

(71) Applicant: KOREA INSTITUTE OF SCIENCE AND TECHNOLOGY, Seoul (KR)

(72) Inventors: Myoung Woon Moon, Seoul (KR); Seong Jin Kim, Seoul (KR); Young A Lee, Seoul (KR); Young Cheol Park, Seoul (KR); Cho Hee Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 16/808,366

(22) Filed: Mar. 4, 2020

(65) Prior Publication Data

US 2020/0282335 A1  Sep. 10, 2020

(30) Foreign Application Priority Data

Mar. 5, 2019 (KR) .......................... 10-2019-0025179

(51) Int. Cl.
*B01D 17/04* (2006.01)
*C02F 1/40* (2006.01)
*C02F 1/00* (2006.01)
*B01D 17/00* (2006.01)
*E02B 15/04* (2006.01)
*C02F 101/32* (2006.01)

(52) U.S. Cl.
CPC .......... *B01D 17/045* (2013.01); *B01D 17/10* (2013.01); *C02F 1/004* (2013.01); *C02F 1/40* (2013.01); *C02F 2101/32* (2013.01); *E02B 15/045* (2013.01)

(58) Field of Classification Search
CPC .......... B01D 17/045; B01D 17/10; C02F 1/40
USPC .................... 210/335, 337, 338, 799, DIG. 5
See application file for complete search history.

(56) References Cited

U.S. PATENT DOCUMENTS

| | | | | |
|---|---|---|---|---|
| 2006/0049096 | A1* | 3/2006 | Bassett | B01D 27/06 210/337 |
| 2006/0266693 | A1* | 11/2006 | Yoshida | B01D 35/027 210/335 |
| 2014/0008283 | A1* | 1/2014 | Mabe | C02F 1/40 210/282 |
| 2015/0027942 | A1* | 1/2015 | Chen | B01D 17/10 210/323.2 |
| 2015/0225290 | A1* | 8/2015 | Lee | B01D 39/083 216/7 |
| 2015/0343341 | A1* | 12/2015 | Carrion | B01D 29/54 210/338 |
| 2018/0179717 | A1* | 6/2018 | Lee | C02F 1/40 |

(Continued)

FOREIGN PATENT DOCUMENTS

KR    1998033085 A    7/1998

*Primary Examiner* — Christopher Upton
(74) *Attorney, Agent, or Firm* — Cantor Colburn LLP

(57) ABSTRACT

The present disclosure relates to a filter apparatus for oil-water separation, and according to an embodiment of the present disclosure, when the filter apparatus for oil-water separation is mounted in a mixed fluid storage tank for storing a mixed fluid collected in seas or rivers in the event that an oil spill accident occurs, it is possible to drain off only water in the mixed fluid.
In addition, it is possible to increase the storage efficiency of the mixed fluid storage tank by selectively draining and removing only water other than oil and impurities in the mixed fluid stored in the mixed fluid storage tank.

5 Claims, 17 Drawing Sheets

(56) References Cited

U.S. PATENT DOCUMENTS

2018/0200645 A1* 7/2018 Krasinski ............... B01D 17/10
2019/0105587 A1* 4/2019 Pietschner ........... B01D 17/045
2019/0161368 A1* 5/2019 Moon ....................... C02F 1/40

* cited by examiner

Sample #1

Sample #2

Sample #3

Sample #4

Sample #5

| Sample No. | Spacing (μm) | Porosity (%) |
|---|---|---|
| 1 | 62.2 | 2.7 |
| 2 | 124.7 | 4.7 |
| 3 | 160.9 | 9.7 |
| 4 | 169.8 | 22.5 |
| 5 | 190.5 | 29.8 |

<Nanostructured hydrophilic porous oil-water separation filter type and porosity>

<Changes in oil breakthrough pressure according to porosity and sample type>

Sample #1

Sample #5

<Water flux measurement and water flux versus porosity graph>

(a)

(b)

<Hydrophilic material>

<Superhydrophilic material>

(a)

(b)

FILTER APPARATUS FOR OIL-WATER SEPARATION

TECHNICAL FIELD

The present disclosure relates to a filter apparatus for oil-water separation.

BACKGROUND ART

In general, when oil spill accidents occur in seas, emergency equipment such as absorbent papers or oil skimmers is used.

In this instance, oil recovered through the emergency equipment is collected in an oil storage container, and fluids collected in the oil storage container include oil as well as a considerable amount of water and many solid impurities present in water all mixed together.

In this instance, due to a density difference between water and oil, oil recovered in the oil storage container is at the upper part of the oil storage container and water is at the lower part, and it is known that water occupies 90% or more of the entire oil storage container.

It is because the oil recovery efficiency of the emergency equipment is very low, and to continuously use the emergency equipment at emergency zones, it is necessary to drain off water that occupies most of the volume of the oil storage container.

Meanwhile, to drain off water other than oil in the mixed liquids stored in the oil storage container, it is necessary to attach an oil-water separation filter to the drain line of the oil storage container, and selectively drain only water out of the oil storage container.

Additionally, when an oil spill accident occurs, in the process of recovering oil at the seashore or riverside, oil is recovered in a mixed state with water and many solid impurities such as algae or soils, and the solid impurities clog the hole of the oil-water separation filter, causing a significant reduction in oil-water separation efficiency, so there is a need for an approach to prefilter the floating solid impurities in the oil-water separation filter.

RELATED LITERATURES

Patent Literatures (Patent Literature 1) Korean Patent Publication No. 10-1998-033085 'Filter for oil-water separation'

SUMMARY

Technical Problem

The present disclosure is conceived in the above-described background, and therefore the present disclosure is directed to providing a filter apparatus for oil-water separation that is mounted in a mixed fluid storage tank for storing a mixed fluid collected in seas or rivers when an oil spill accident occurs, to drain off only water in the mixed fluid.

In addition, the present disclosure is aimed at increasing the storage efficiency of the mixed fluid storage tank by selectively draining and removing only water other than oil and impurities in the mixed fluid stored in the mixed fluid storage tank.

The object of the present disclosure is not limited thereto, and another object not mentioned herein will be clearly understood by those skilled in the art from the following description.

Technical Solution

To achieve the object, an embodiment of the present disclosure provides a filter apparatus for oil-water separation including a prefilter module having an internal space to allow a prefiltered fluid in an external mixed fluid to flow in while disallowing an external impurity to flow in, and a first hydrophilic filter module provided on an inner side of the prefilter module to filter the prefiltered fluid.

Additionally, there is provided the filter apparatus for oil-water separation wherein the first hydrophilic filter module includes a core made of a second hydrophilic material, and a shell of a first hydrophilic material that is wrapped around an outer peripheral surface of the core.

Additionally, there is provided the filter apparatus for oil-water separation wherein the core is formed in a porous structure.

Additionally, there is provided the filter apparatus for oil-water separation wherein the first hydrophilic filter module is formed in a mesh structure of first hydrophilic surface nanostructures.

Additionally, there is provided the filter apparatus for oil-water separation further including a mesh support to support the first hydrophilic filter module in an outward direction within the internal space of the prefilter module.

Advantageous Effects

According to an embodiment of the present disclosure, when a filter apparatus for oil-water separation is mounted in a mixed fluid storage tank for storing a mixed fluid collected in seas or rivers in the event that an oil spill accident occurs, it is possible to drain off only water in the mixed fluid.

In addition, it is possible to increase the storage efficiency of the mixed fluid storage tank by selectively draining and removing only water other than oil and impurities in the mixed fluid stored in the mixed fluid storage tank.

DETAILED DESCRIPTION

Hereinafter, some embodiments of the present disclosure will be described in detail through the exemplary drawings. It should be noted that in adding the reference signs to the elements of each drawing, like elements have like reference signs if possible even though they are indicated on different drawings. Additionally, in describing the present disclosure, when a certain detail of relevant known elements or functions is determined to render the subject matter of the present disclosure vague, the detailed description is omitted herein.

Furthermore, in describing the elements of the present disclosure, the terms 'first', 'second', A, B, (a), (b), and the like may be used. These terms are only used to distinguish one element from another, and the nature of the corresponding element or its sequence or order is not limited by the term. It should be understood that when an element is referred to as being "connected", "coupled" or "linked" to another element, it may be directly connected or linked to other element, but intervening elements may be "connected", "coupled" or "linked" between each element.

Figure 1:
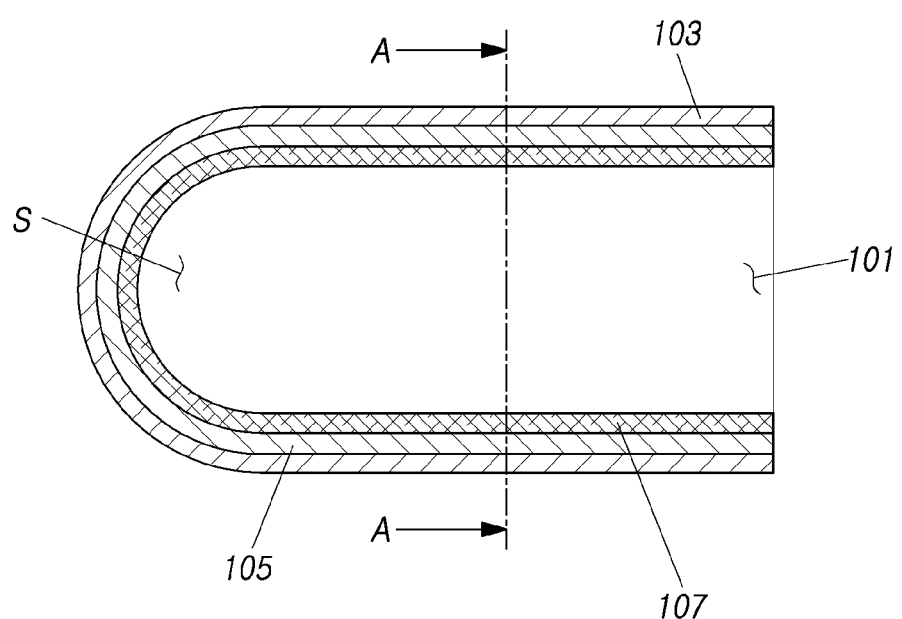
FIG. 1 is a cross-sectional view showing a filter apparatus for oil-water separation according to an embodiment of the present disclosure.

FIG. 1 is a cross-sectional view showing a filter apparatus for oil-water separation according to an embodiment of the present disclosure.

Figure 2:
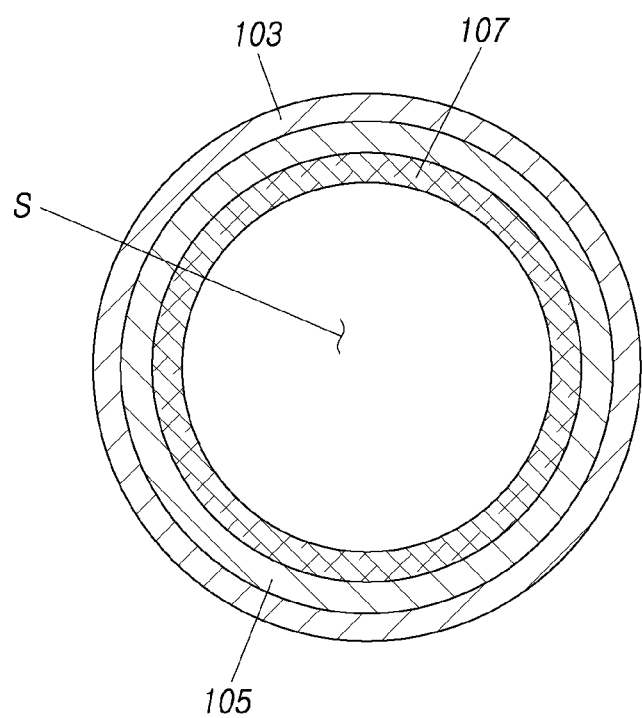
FIG. 2 is a cross-sectional view taken along the line A-A of the filter apparatus for oil-water separation of FIG. 1.

FIG. 2 is a cross-sectional view taken along the line A-A of the filter apparatus for oil-water separation of FIG. 1.

Figure 3:
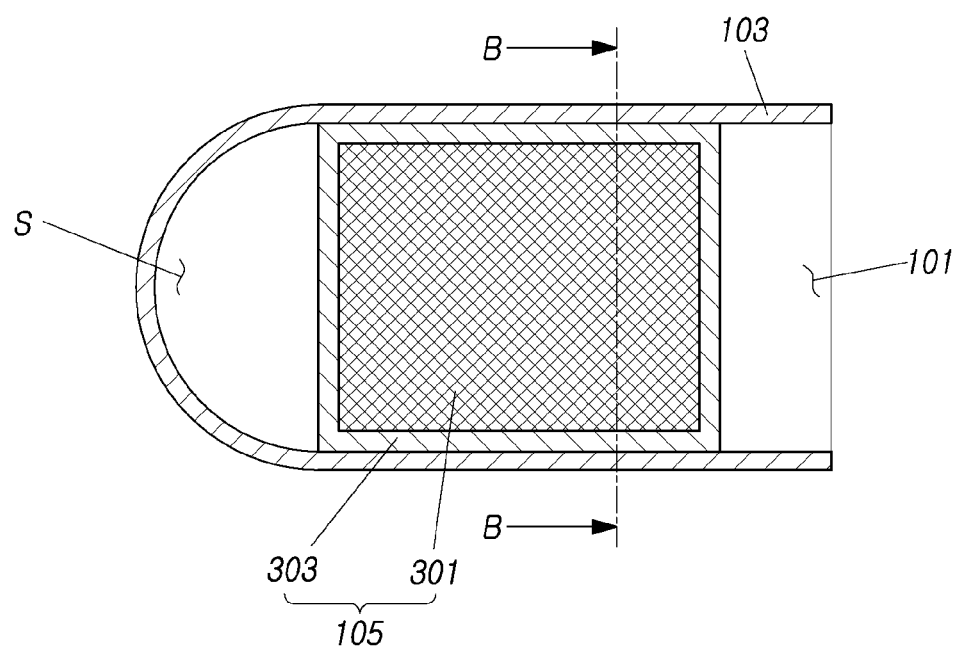
FIG. 3 is a cross-sectional view showing a filter apparatus for oil-water separation according to another embodiment of the present disclosure.

FIG. 3 is a cross-sectional view showing a filter apparatus for oil-water separation according to another embodiment of the present disclosure.

Figure 4:
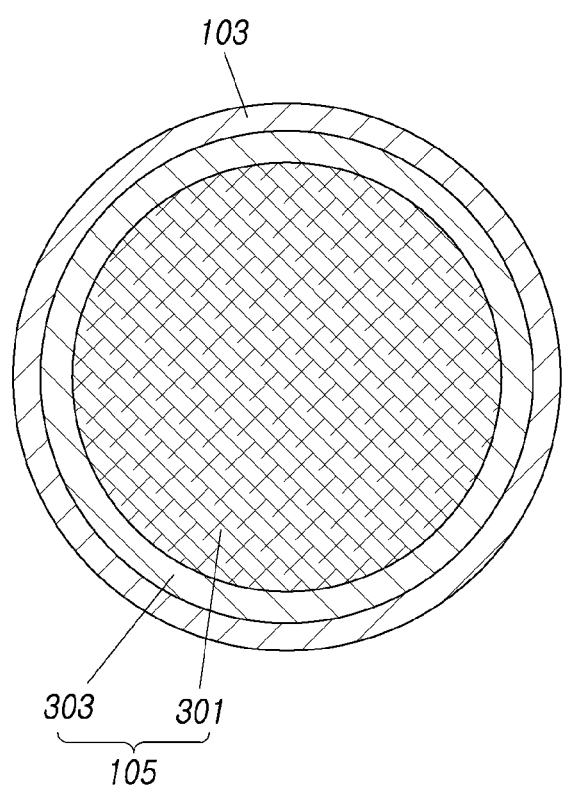
FIG. 4 is a cross-sectional view taken along the line B-B of the filter apparatus for oil-water separation of FIG. 3.

FIG. 4 is a cross-sectional view taken along the line B-B of the filter apparatus for oil-water separation of FIG. 3.

Figure 5:
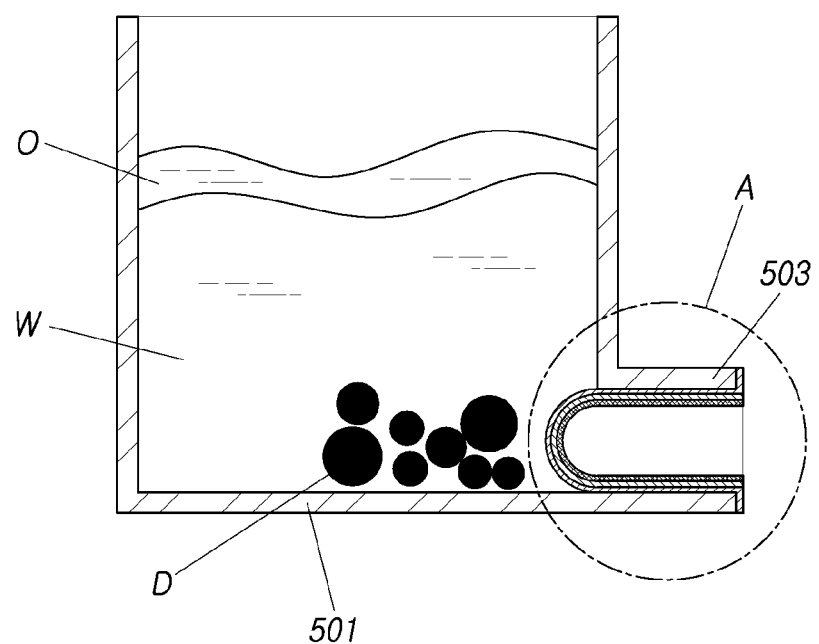
FIG. 5 is a diagram showing a filter apparatus for oil-water separation according to still another embodiment of the present disclosure.

FIG. 5 is a diagram showing a filter apparatus for oil-water separation according to still another embodiment of the present disclosure.

Figure 6:
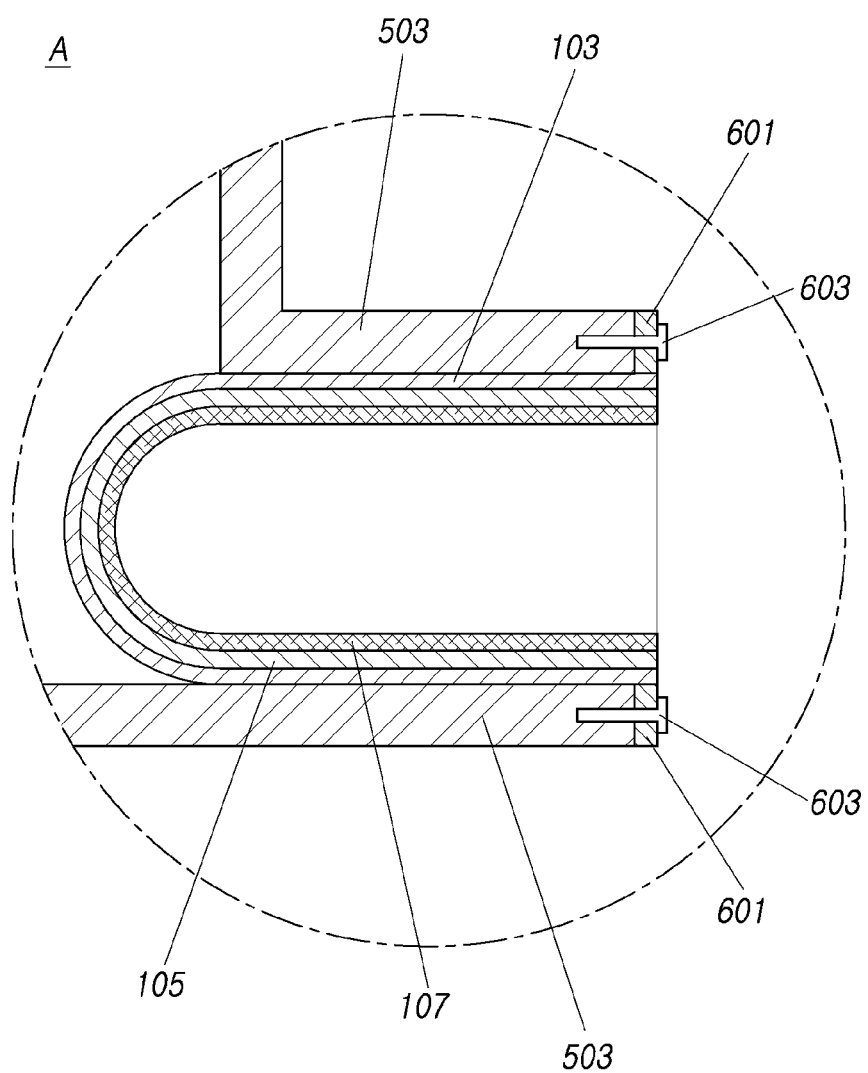
FIG. 6 is a diagram showing an example of a coupling structure of a prefilter module and a mixed fluid storage tank in the filter apparatus for oil-water separation of FIG. 5.

FIG. 6 is a diagram showing an example of a coupling structure of a prefilter module and a mixed fluid storage tank in the filter apparatus for oil-water separation of FIG. 5.

Figure 7:
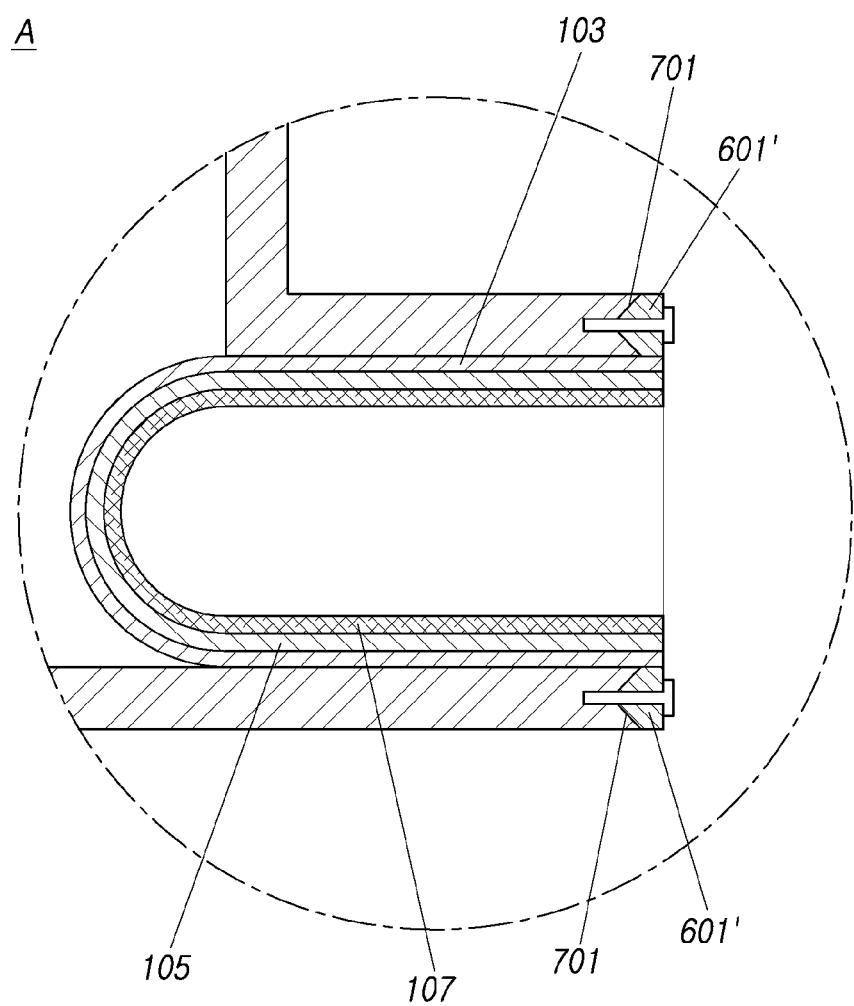
FIG. 7 is a diagram showing another example of a coupling structure of a prefilter module and a mixed fluid storage tank in the filter apparatus for oil-water separation of FIG. 5.

FIG. 7 is a diagram showing another example of a coupling structure of a prefilter module and a mixed fluid storage tank in the filter apparatus for oil-water separation of FIG. 5.

As shown in these drawings, the filter apparatus for oil-water separation according to an embodiment of the present disclosure includes a prefilter module 103 having an internal space S to allow a prefiltered fluid in an external mixed fluid to flow in while disallowing external impurities to flow in, and a first hydrophilic filter module 105 provided on the inner side of the prefilter module 103 to filter the prefiltered fluid.

Hereinafter, first hydrophilic is referred to as superhydrophilic, and second hydrophilic is referred to as hydrophilic.

The term hydrophilic may be defined as a property of a material having the water contact angle of less than 90°, and the term superhydrophilic may be defined as a property of a material having the water contact angle of 15° or less. The prefilter module 103 blocks and filters out the external impurities (impurities in the mixed fluid).

Here, the external impurities may be solid impurities in the mixed fluid, for example, soils, mosses and algae.

The prefilter module 103 has the internal space S to allow the prefiltered fluid in the external mixed fluid to flow in.

The prefilter module 103 is formed from a hydrophilic material, and performs an oil-water separation function while disallowing the external impurities to flow in.

Meanwhile, the prefilter module 103 is formed in an overhanging structure, and as shown in the drawings, the prefilter module 103 is formed of a three-dimensional structure having an outlet 101 that is open to a side and a rounded closed side opposite the open side.

To test a better effect of the overhanging prefilter module 103 than a flat hydrophilic filter, the water flux of each of the overhanging prefilter module and the flat hydrophilic filter is measured and the measured water fluxes are compared.

Figure 11:
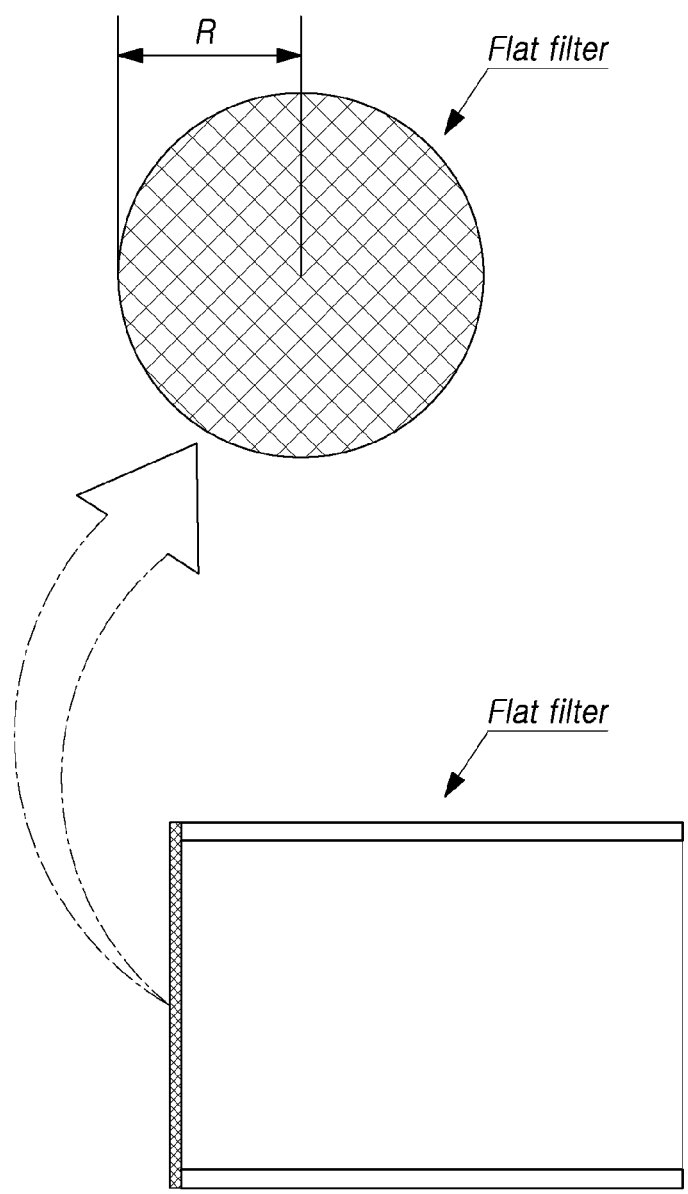
FIG. 11 is a diagram showing a flat hydrophilic filter.
Figure 12:
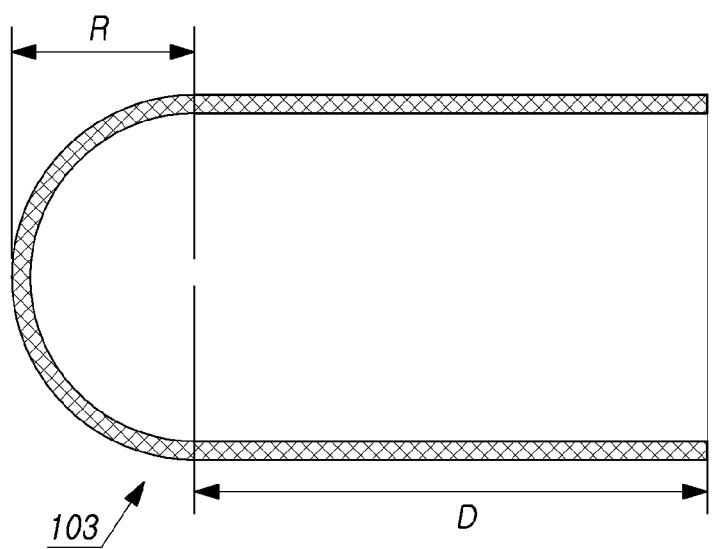
FIG. 12 is a diagram showing an overhanging prefilter module (an overhanging hydrophilic filter).
Figure 13:
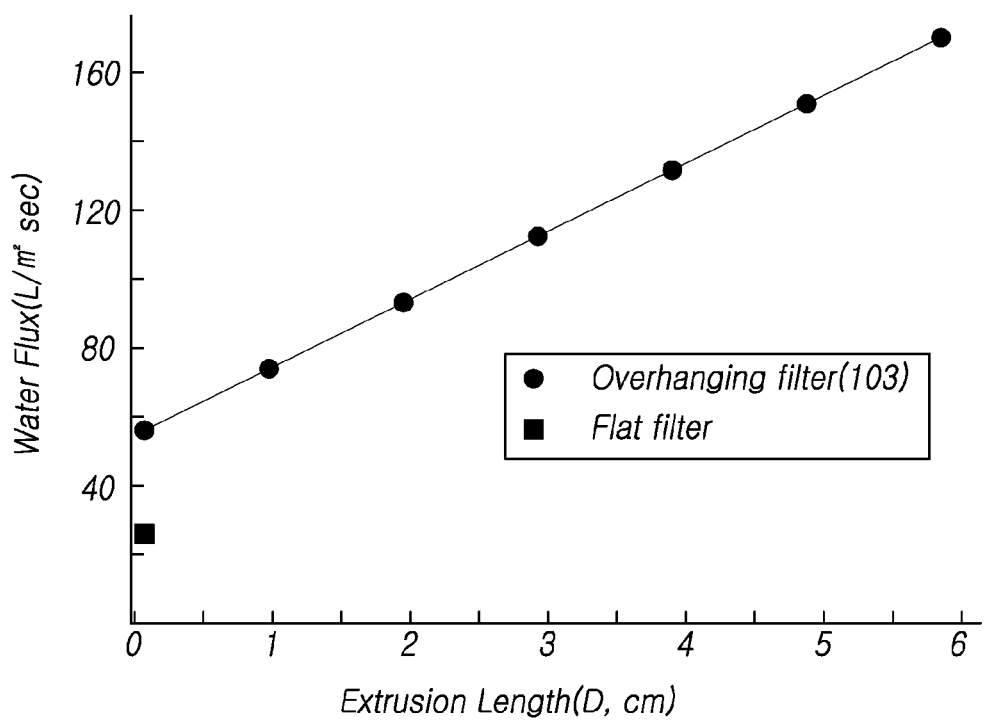
FIG. 13 is a diagram showing a comparison graph of water flux between the flat hydrophilic filter of FIG. 11 and the overhanging prefilter module of FIG. 12.

As shown in FIGS. 11 to 13, in the case of the flat hydrophilic filter with a cross section having the diameter of 6 cm, when the surface area is $\pi R^2$, it can be seen that water drains away as much as the water flux of about 28 L/m² sec.

In the case of the overhanging prefilter module (the overhanging hydrophilic filter), the water flux changes depending on the length of the overhang.

In the case of the overhanging hydrophilic filter, when the semispherical overhang entrance having the diameter R and the extrusion length having the depth D are defined, the surface area may be calculated by $2\pi R(R+D)$, and as D changes from 0 to 6 cm, the value of water flux changes from about 56 to 169 L/m² sec.

Accordingly, when R=3 cm and D=6 cm, it can be seen that the water flux of the overhanging hydrophilic filter is about 6 times higher than that of the flat hydrophilic filter.

Figure 14:
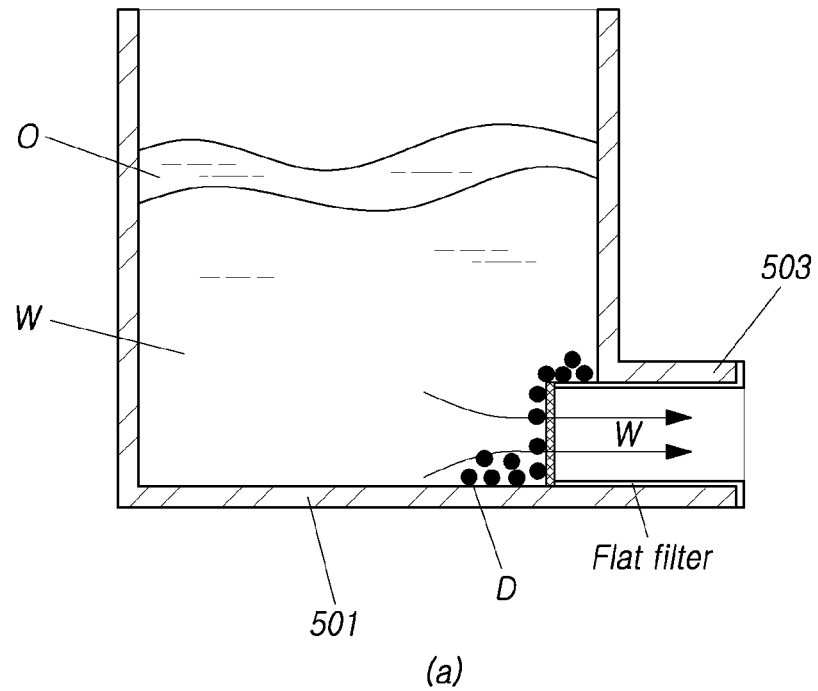
FIG. 14 is a diagram showing an example of solids removal of a filter apparatus for oil-water separation according to an embodiment of the present disclosure versus the flat hydrophilic filter of FIG. 11.
Figure 14:
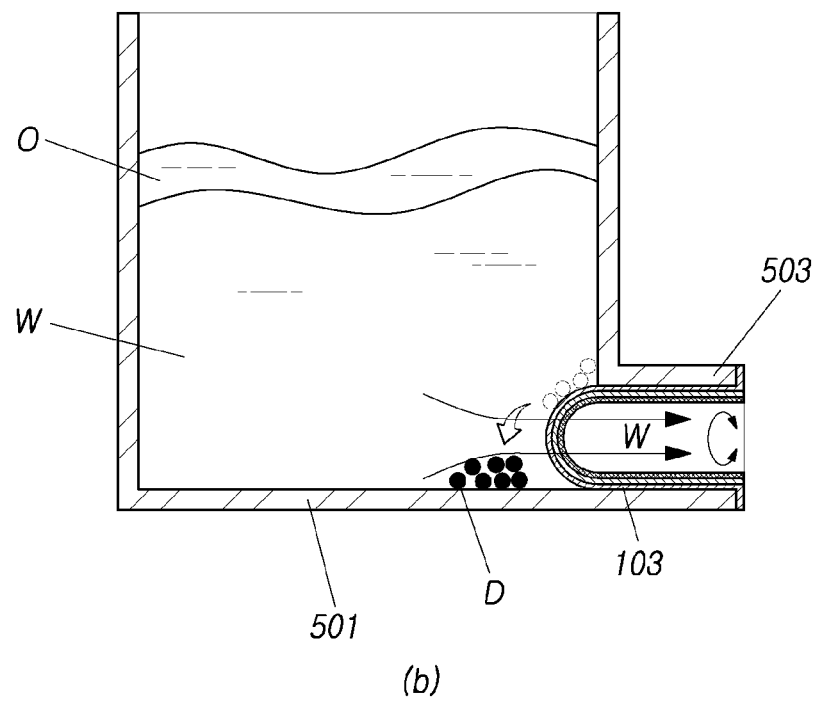

Referring to FIG. 14, the biggest difference between the flat hydrophilic filter and the overhanging hydrophilic filter is a difference in clogging phenomenon by solids D in the mixed liquids.

That is, in the case of the flat hydrophilic filter, the solids D are more likely to build up on the surface, whereas in the case of the curved overhanging hydrophilic filter, the solids D are less likely to stay on the surface.

This is a very important feature that can prevent water flux reduction.

To keep the water flux constantly high, the overhanging hydrophilic filter may be rotated to remove the solids that may clog the filter surface on top of the overhanging hydrophilic filter.

Subsequently, the superhydrophilic filter module 105 is provided on the inner side of the prefilter module 103.

The superhydrophilic filter module 105 filters the prefiltered fluid.

That is, the superhydrophilic filter module 105 filters out the remaining impurities (oil) in the fluid prefiltered through the prefilter module 103 to allow only water to pass to the outside.

For example, the superhydrophilic filter module 105 may be formed in a mesh structure having superhydrophilic surface nanostructures.

The superhydrophilic filter module 105 may have the surface nanostructures having underwater superoleophobic properties, and may have a porous structure and the water content of about 10%.

Figure 8:
FIG. 8 is a diagram showing the type and porosity of a nanostructured hydrophilic porous oil-water separation filter.
Figure 8:
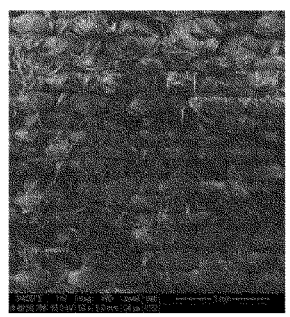
Figure 8:
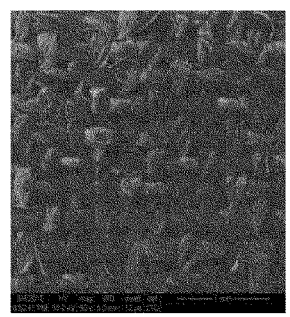
Figure 8:
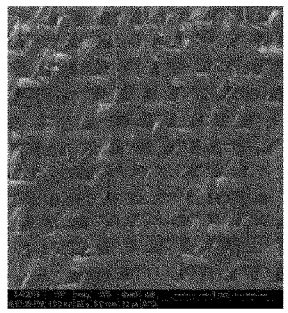
Figure 8:
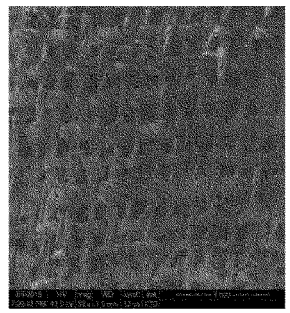
Figure 9:
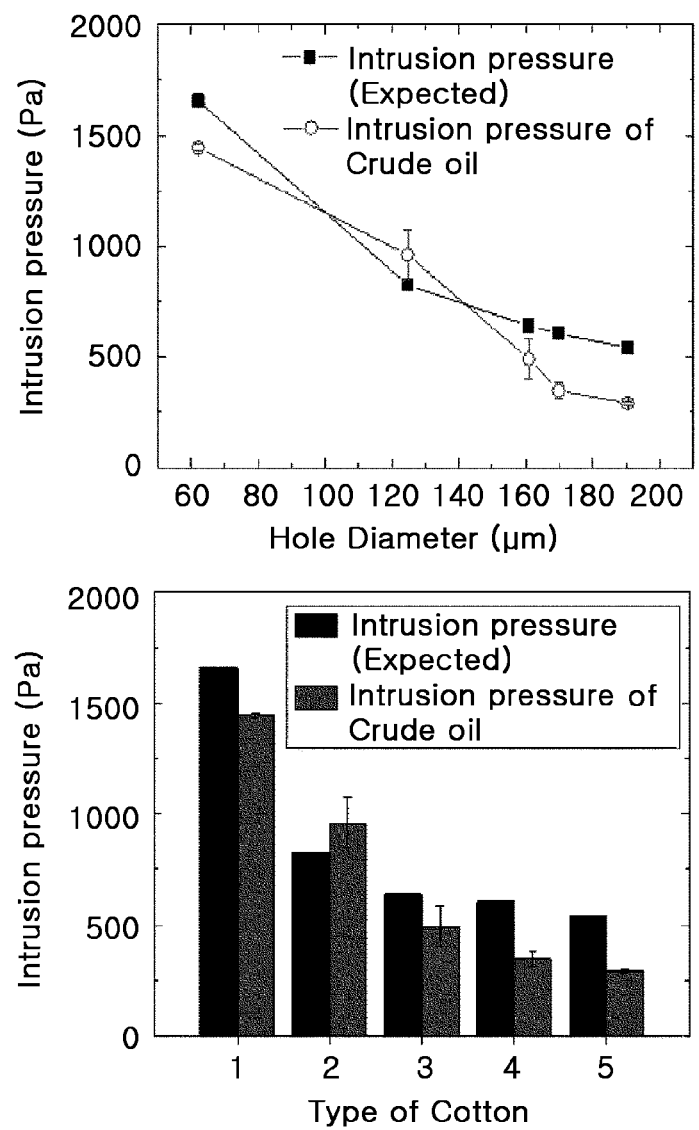
FIG. 9 is a diagram showing changes in oil breakthrough pressure according to porosity and sample type.
Figure 10:
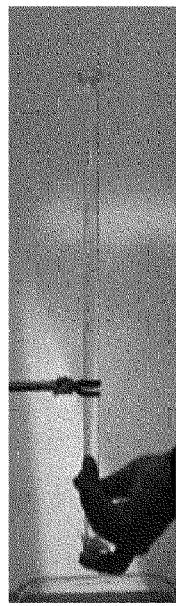
FIG. 10 is a diagram showing water flux measurement and a water flux vs porosity graph.
Figure 10:
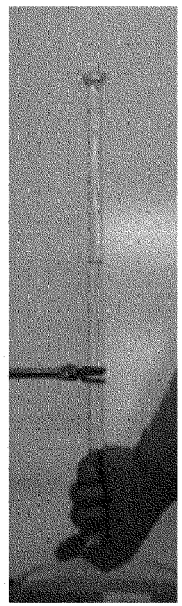
Figure 10:
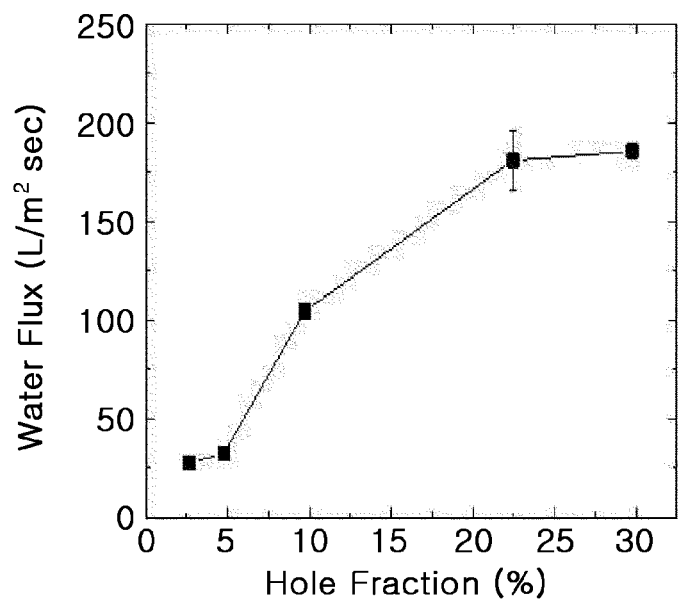

As shown in FIGS. 8 to 10, the oil-water separation property is evaluated using samples of the superhydrophilic filter module 105, and the water-oil separation property of each sample is quantitated by measuring the water drainage speed and the oil breakthrough pressure, and through this, it can be seen that as the spacing of pores increases, the porosity increases.

The oil breakthrough pressure changes depending on the pore size and sample type, and it can be seen that as the pore size is larger, the oil breakthrough pressure is lower.

Additionally, the water drainage speed through the filter shows results that are contrary to the oil breakthrough pressure, and it can be seen that as the hole fraction increases, the water drainage speed significantly increases.

Here, it can be seen that the water drainage speed and the oil breakthrough pressure are in a trade-off relationship, in other words, the sample with a high water drainage speed has a low oil breakthrough pressure, and the sample with a low water drainage speed has a very high oil breakthrough pressure.

Meanwhile, in the experiment of oil breakthrough pressure measurement using the samples for the oil-water separation filter, a cellulose acetate material that is a high density hydrophilic material is used, and in the test using olive oil, it is found to withstand the pressure of 1.15 m or higher for density of 916 kg/m³.

Meanwhile, the superhydrophilic filter module 105 may include a core 301 made of a hydrophilic material, and a shell 303 of a superhydrophilic material that is wrapped around the outer peripheral surface of the core 301.

The core 301 is made of a hydrophilic material.

Here, the hydrophilic material includes, for example, a natural fiber (cotton, pulp, cellulose, rayon), polymers (acrylic, polypropylene (PP), polystyrene (PS), polyurethane (PU), acrylic), or metals.

Meanwhile, the core 301 may be formed in a porous structure surface-treated to be hydrophilic.

The shell 303 is wrapped around the outer peripheral surface of the core 301.

The shell 303 is made of a superhydrophilic material.

Figure 15:
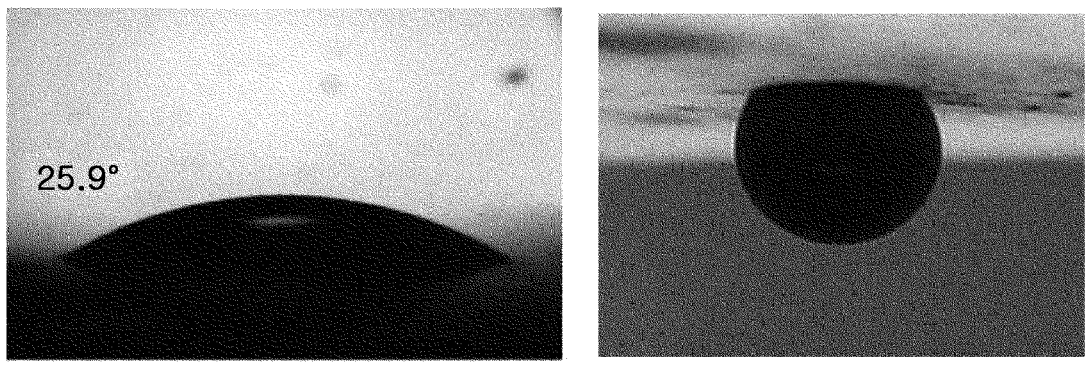
FIG. 15 is a diagram showing a comparison between a hydrophilic material and a superhydrophilic material.
Figure 15:
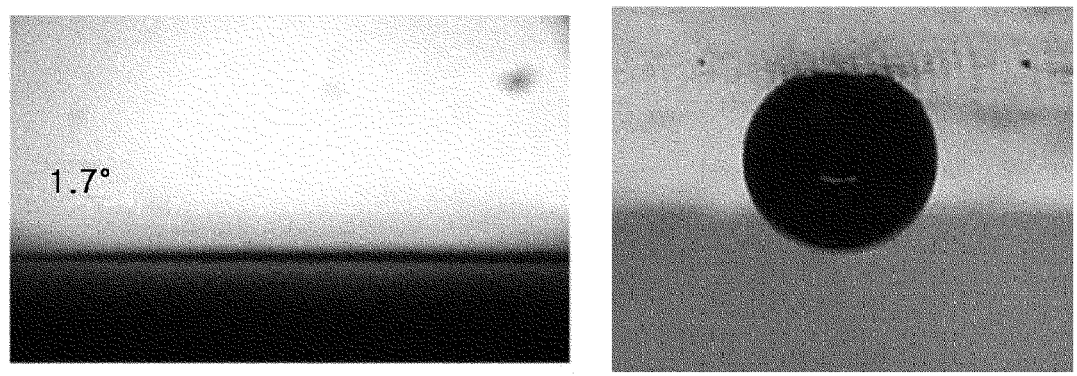

The <hydrophilic material> of FIG. 15 exhibits hydrophilicity with the water contact angle of about 26° in air on the nonwoven fabric surface.

This material shows the underwater oil contact angle of about 120° for an oil droplet in water, and oil easily adheres to the material.

That is, the material is prone to surface contamination with oil in water.

However, in the case of the <superhydrophilic material> of FIG. 15 having a superhydrophilic surface with the water contact angle of less than 15° on the surface in air, the material has a superoleophobic surface with the underwater oil contact angle of 170° or above.

That is, oil does not adhere to the surface of the material.

Figure 16:
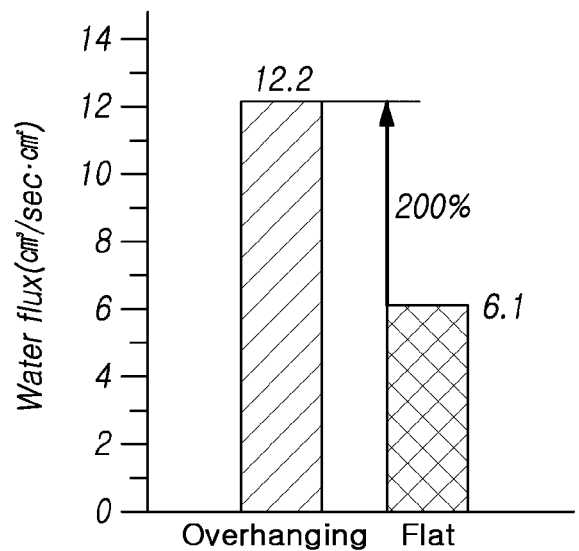
FIG. 16 is a diagram showing a comparison graph of pure water flux and turbid water flux of an overhanging filter and a flat filter.
Figure 16:
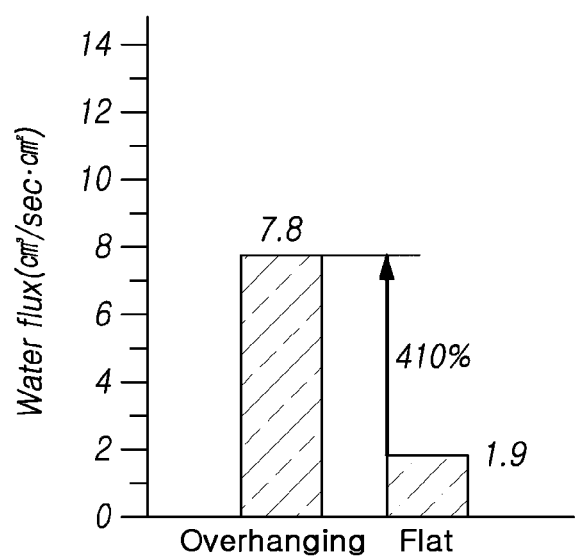
Figure 17:
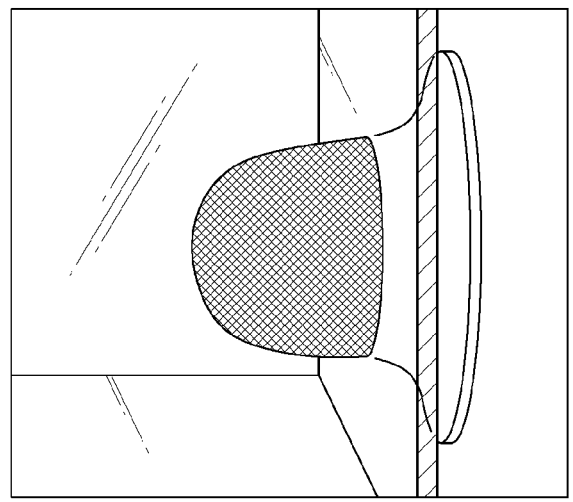
FIG. 17 is a diagram showing an overhanging filter sample.

(a) in FIG. 16 shows a comparison of the water flux passing through the overhanging filter ((b) in FIG. 14) and the flat filter ((a) in FIG. 14) (the amount of water passing through a unit area per unit time).

When the same amount of water (1025 mL) is allowed to pass through the overhanging filter and the flat filter, the overhanging filter shows the flux of 12.2 mL/sec·cm², and the flat filter shows the flux of 6.1 mL/sec·cm².

That is, the overhanging filter has the flux that is about twice higher than the flat filter.

This is the same as theoretical prediction.

(b) in FIG. 16 shows the water flux containing impurities passing through the two filters.

The impurities are a combination of particles of between 100 micrometers to 2 mm.

In the case of the overhanging filter, the flux is about 7.8 mL/sec·cm², and in the case of the flat filter, the flux is about 1.9 mL/sec·cm², and thus the overhanging filter shows the flux that is about 4.1 times higher than the flat filter.

That is, it is evaluated that the overhanging filter will get far less clogged than the flat filter.

Meanwhile, the filter apparatus for oil-water separation according to an embodiment of the present disclosure may further include a mesh support 107 to support the superhydrophilic filter module 105 in an outward direction within an internal space S of the prefilter module 103.

The filter apparatus for oil-water separation further includes the mesh support 107 to prevent deformation and damage of the prefilter module 103 and the superhydrophilic filter module 105 under the high pressure applied by the mixed fluid and impurities.

Additionally, the filter apparatus for oil-water separation according to an embodiment of the present disclosure may further include a mixed fluid storage tank 501 having a space for storing the mixed fluid and a drain line 503 on the lower side.

The mixed fluid stored in the mixed fluid storage tank 501 includes water W, oil O and solid impurities D.

Meanwhile, the prefilter module 103 and the superhydrophilic filter module 105 is inserted and fixed into the drain line 503 of the mixed fluid storage tank 501.

To this end, a flange 601 extends from the end of the prefilter module 103 along the edge of the open outlet 101 of the prefilter module 103, and is fixed and coupled to the end of the drain line 503 with a fixing element 603.

Here, the flange 601 may be integrally formed at the end of the prefilter module 103, or the flange 601 may be formed as an independent component and coupled to the end of the prefilter module 103.

Meanwhile, as shown in FIG. 7, the flange 601 protrudes in the other direction (i.e., in a direction opposite the open outlet 101 of the prefilter module 103), and the protruding part may be inserted and fixed into a groove 701 that is recessed at the end of the drain line 503.

As described above, according to an embodiment of the present disclosure, when the filter apparatus for oil-water separation is mounted in the mixed fluid storage tank for storing a mixed fluid collected in seas or rivers in the event that an oil spill accident occurs, it is possible to drain off only water in the mixed fluid. Additionally, it is possible to it is possible to increase the storage efficiency of the mixed fluid storage tank by selectively draining and removing only water other than oil and impurities in the mixed fluid stored in the mixed fluid storage tank.

Although the foregoing describes that all the elements constituting the embodiment of the present disclosure are combined into one or work in combination, the present disclosure is not necessarily limited to the disclosed embodiment. That is, the elements may be selectively combined into at least one and work in combination within the intended scope of the present disclosure.

It should be understood, unless otherwise stated to the contrary, the terms "including", "comprising" or "having" as used herein specify the presence of mentioned element, but do not exclude the presence or addition of one or more other elements. Unless otherwise defined herein, all terms used herein including technical or scientific terms have the same meaning as commonly understood by those having ordinary skill in the technical field pertaining to the present disclosure. The commonly used terms such as those defined in dictionaries should be interpreted as being consistent with the meaning in the context of the relevant art, and unless explicitly defined herein, they are not interpreted in ideal or excessively formal sense.

The foregoing description is provided to describe the technical spirit of the present disclosure by way of example only, and it is obvious to those having ordinary skill in the technical field pertaining to the present disclosure that various changes and modifications may be made thereto without departing from the essential features of the present disclosure. Therefore, the embodiments disclosed herein serve to describe the technical spirit of the present disclosure, but not intended to limit the technical spirit of the present disclosure, and the scope of technical spirit of the present disclosure is not limited by these embodiments. The scope of protection of the present disclosure should be interpreted by the appended claims, and the full technical spirit within its equivalent scope should be interpreted as falling within the scope of protection of the present disclosure.

DETAILED DESCRIPTION OF MAIN ELEMENTS

101: Outlet
103: Prefilter module
105: First hydrophilic filter module
107: Mesh support
301: Core
303: Shell
501: Mixed fluid storage tank
503: Drain line
601: Flange
603: Fixing element
701: Groove

The invention claimed is:

1. A filter apparatus for oil-water separation, comprising:
a prefilter module having a hollow and half-capsule shape which has a semispherical end and an open end opposite to the semispherical end and allowing a prefiltered fluid in an external mixed fluid to flow in through an outer surface thereof while disallowing an external impurity in the external mixed fluid to flow in; and
a first hydrophilic filter module having a half-capsule shape and abutting onto an inner surface of the prefilter module to filter the prefiltered fluid.

2. The filter apparatus for oil-water separation according to claim 1, wherein the first hydrophilic filter module is formed in a mesh structure of first hydrophilic surface nano structures.

3. The filter apparatus for oil-water separation according to claim 1 or 2, further comprising:
a mesh support to support the first hydrophilic filter module in an outward direction within the internal space of the prefilter module.

4. A filter apparatus for oil-water separation, comprising:
a prefilter module having a hollow and half-capsule shape which has a semispherical end and an open end opposite to the semispherical end and allowing a prefilter fluid in an external mixed fluid to flow in through an outer surface thereof while disallowing an external impurity in the external mixed fluid to flow in; and
a first hydrophilic filter module having a cylindrical shape and abutting onto an inner cylindrical surface of the prefilter module to filter the prefiltered fluid,
wherein the first hydrophilic filter module comprises:
a core made of a second hydrophilic material; and
a shell of a first hydrophilic material that is wrapped around an outer peripheral surface of the core.

5. The filter apparatus for oil-water separation according to claim 4, wherein the core is formed in a porous structure.

* * * * *